Jan. 12, 1932.  R. MICEK  1,840,592
BRAKING DEVICE FOR AIRCRAFT
Filed April 15, 1930   6 Sheets-Sheet 1
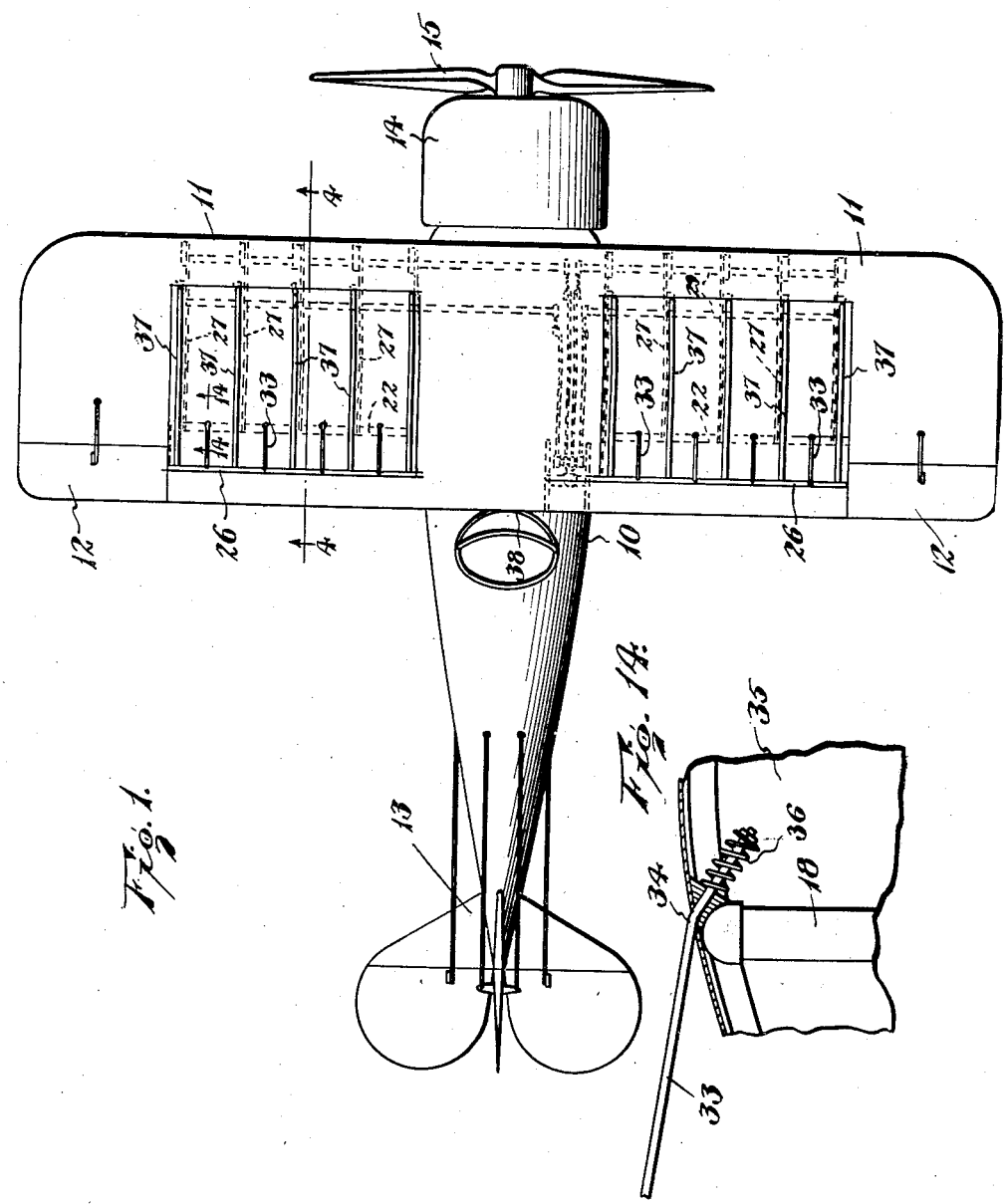
Inventor
R. Micek
By Lacy & Lacey,
Attorney

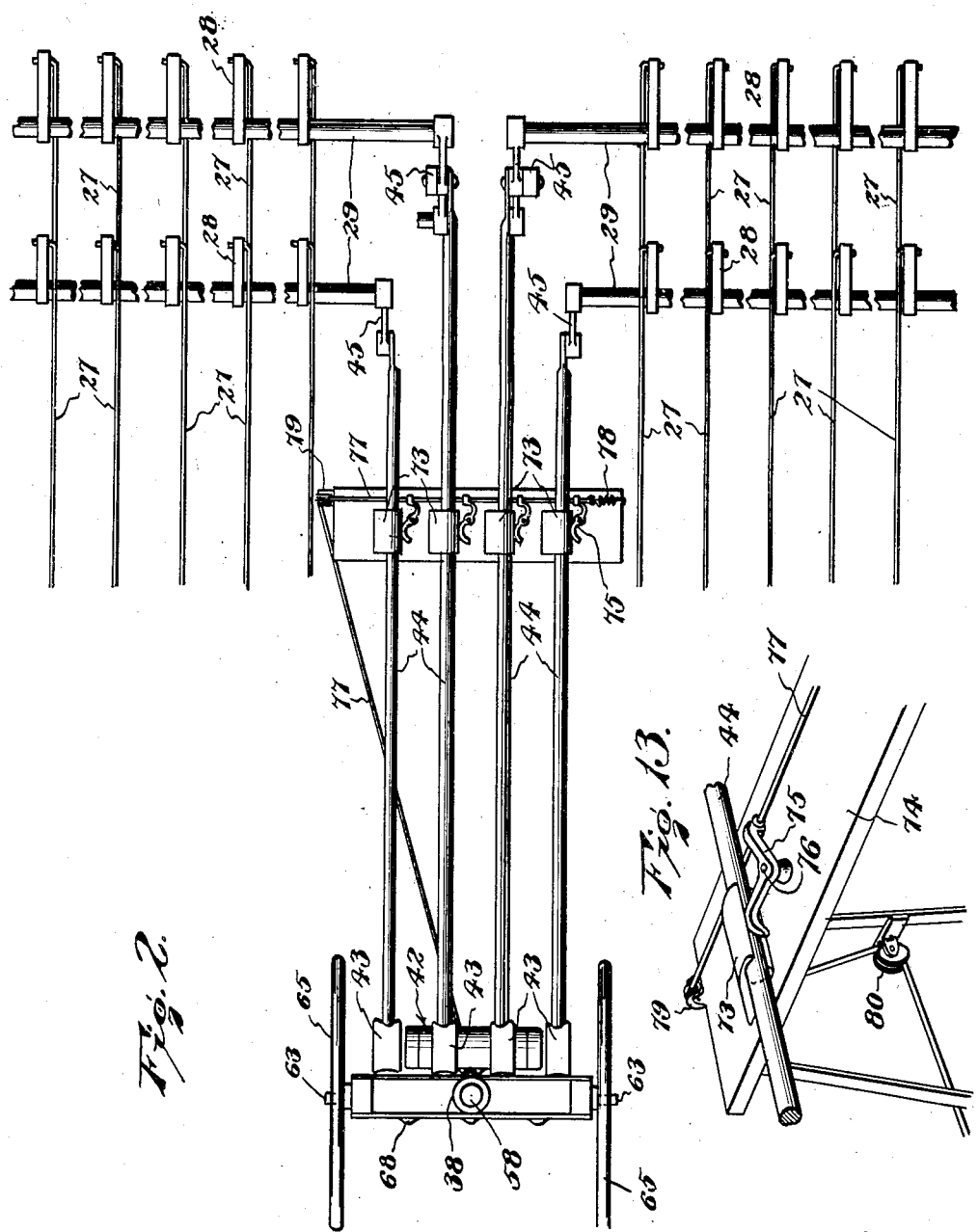

Jan. 12, 1932.  R. MICEK  1,840,592
BRAKING DEVICE FOR AIRCRAFT
Filed April 15, 1930   6 Sheets-Sheet 3
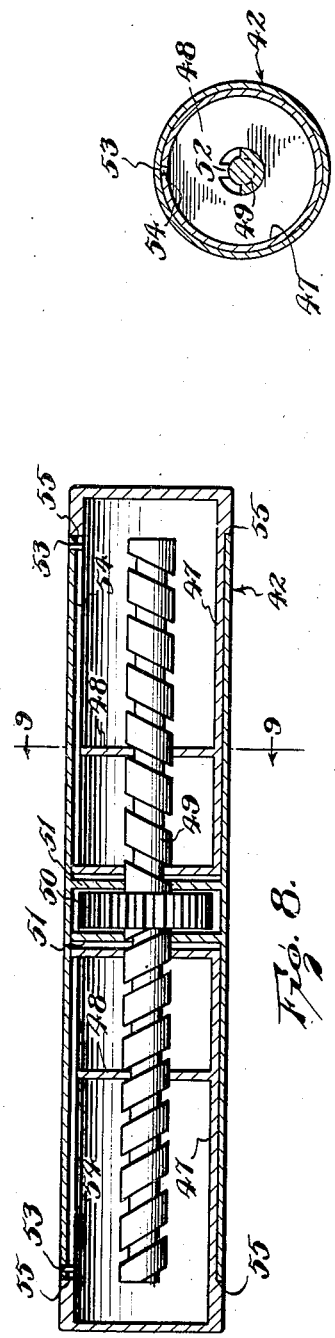
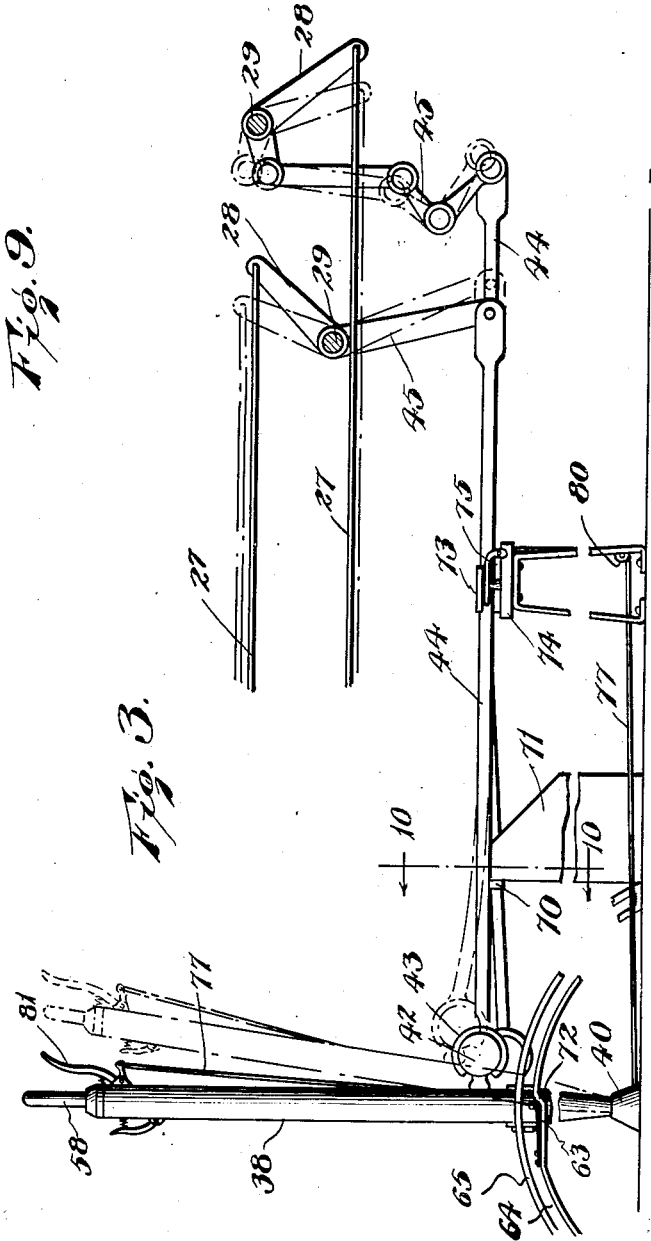
Inventor
R. Micek
By Lacey & Lacey,
Attorneys Jan. 12, 1932.  R. MICEK  1,840,592
BRAKING DEVICE FOR AIRCRAFT
Filed April 15, 1930   6 Sheets-Sheet 4
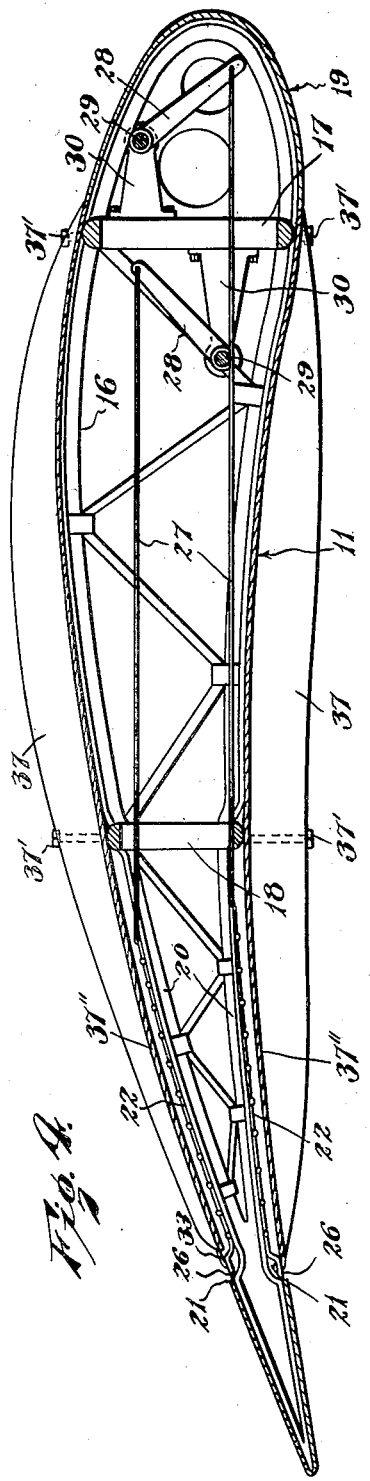
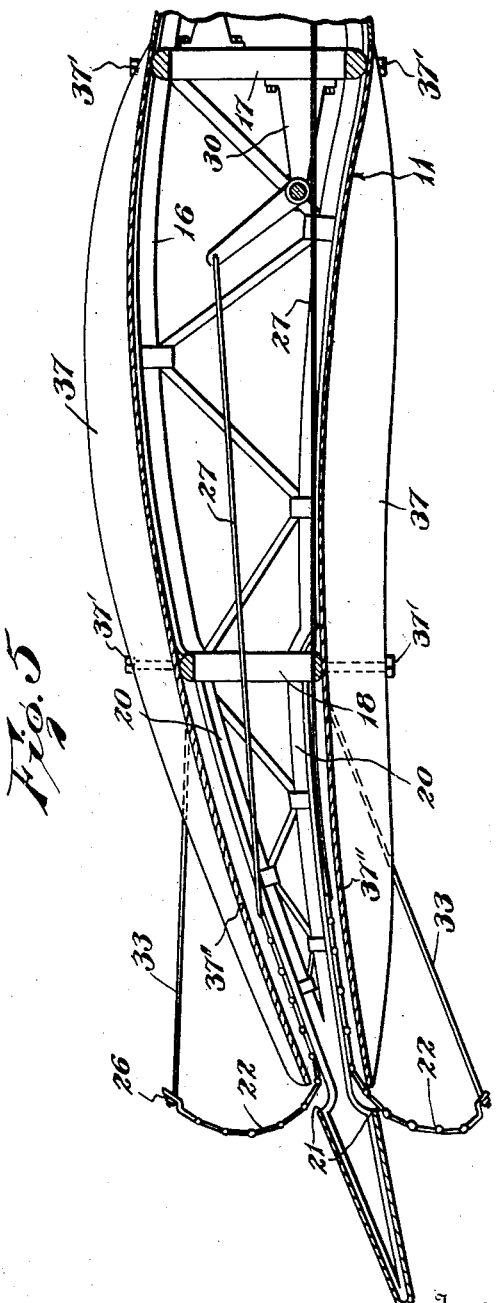
Inventor
R. Micek
By Lacey & Lacey, Attorneys Jan. 12, 1932.  R. MICEK  1,840,592
BRAKING DEVICE FOR AIRCRAFT
Filed April 15, 1930  6 Sheets-Sheet 5
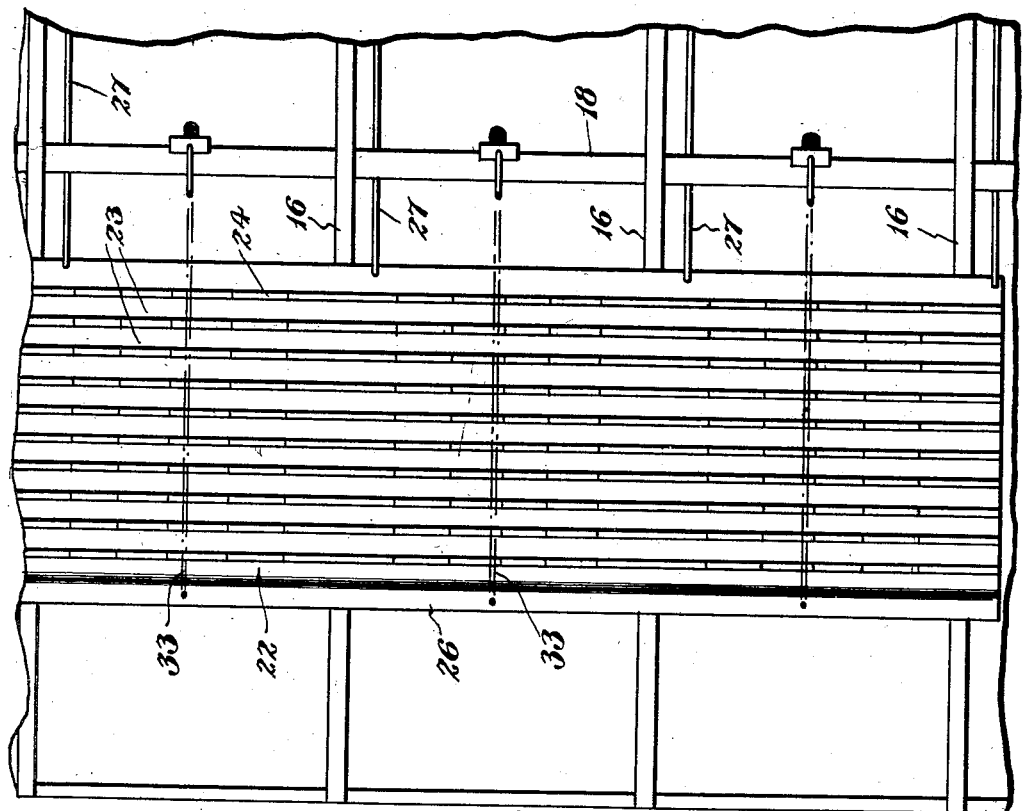
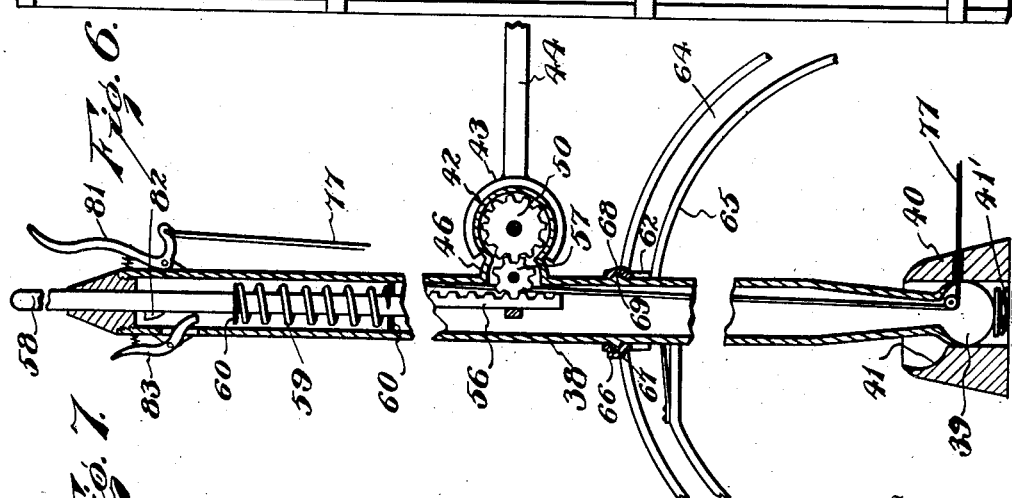
Inventor
R. Micek
By Lacey & Lacey, Attorneys Jan. 12, 1932.   R. MICEK   1,840,592
BRAKING DEVICE FOR AIRCRAFT
Filed April 15, 1930   6 Sheets-Sheet 6
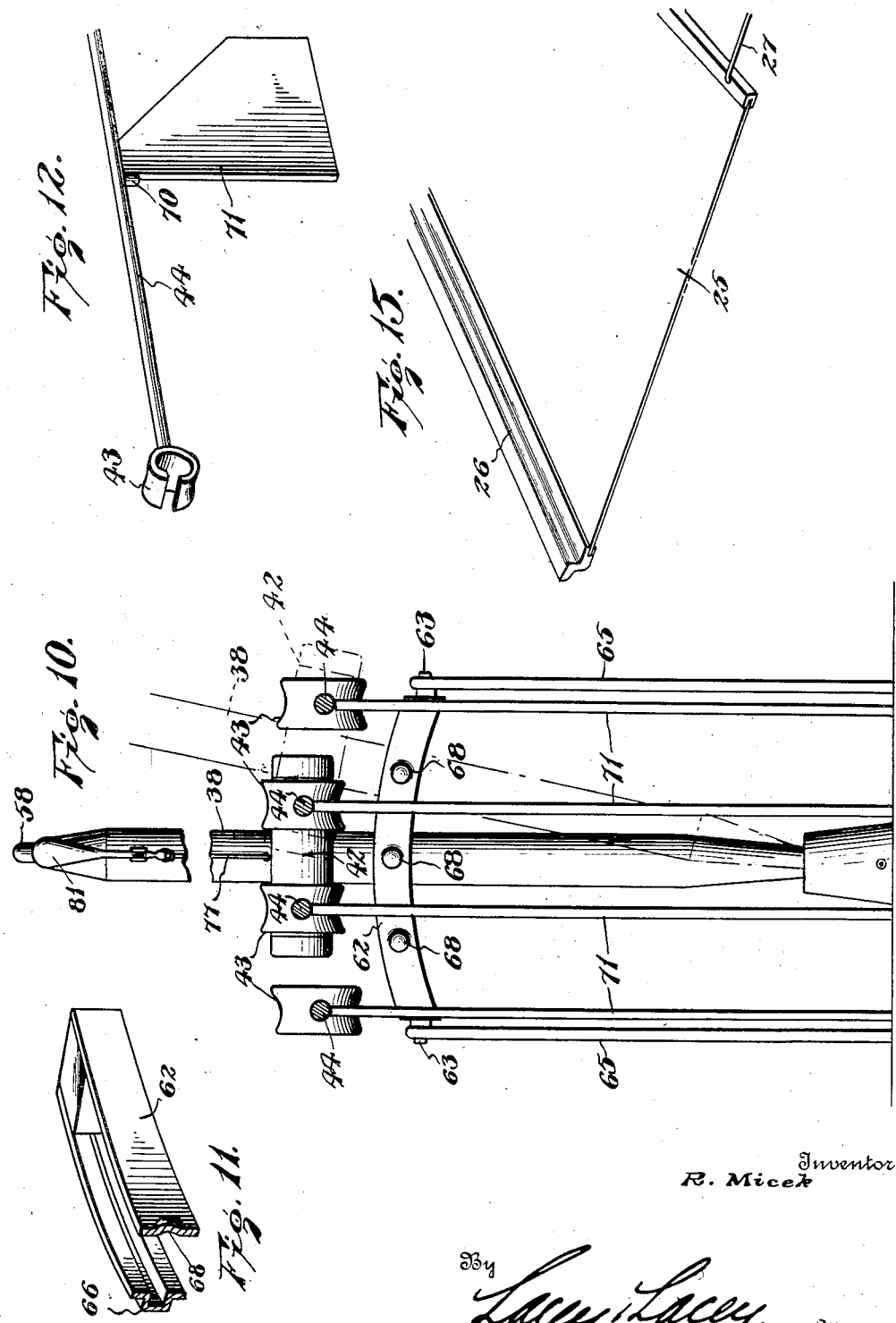

Patented Jan. 12, 1932

1,840,592

UNITED STATES PATENT OFFICE

RICHARD MICEK, OF LOS ANGELES, CALIFORNIA

BRAKING DEVICE FOR AIRCRAFT

Application filed April 15, 1930. Serial No. 444,531.

This invention relates to airplanes and has for an object to provide novel air foils which are normally concealed within the wing structure and may be positively pushed outwardly to extend exteriorly of the wing into the air stream at the moment the plane touches the ground and serve as air brakes to permit landings in small fields and minimize the possible accidents in landing.

A further object is to provide novel air foils which serve as air brakes and are so built into the wing structure as not to interfere with the stream line contour of the wings in flight and which when in operative position will curve forwardly over the trailing edges of the wings and act somewhat as miniature "chutes" to retard speed of the ship in landing.

A further object is to provide novel air brakes on the wings and means which may be conveniently operated by the pilot to selectively apply the brakes on one side of the plane whereby to assist in bringing the plane out of a flat spin.

A further object of the invention is to provide novel air brakes on the wings and novel controlling means for applying the brakes on to one wing top and bottom, or on both wings top and bottom or on both wings either top or bottom whereby resistance to the air stream may be produced as desired by the pilot to control the position of the ship in maneuvering.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawings forming part of the specification,

Figure 1 is a plan view of a high-wing monoplane equipped with my invention,

Figure 2 is a plan view of the operating lever, operating rods, rock shafts, and push rods which control the operation of the air foils or air brakes, Figure 3 is a side elevation of the parts shown in Figure 2 with the parts dotted in position to thrust out the air foils, Figure 4 is a longitudinal sectional view through the airplane wing taken on the line 4—4 of Figure 1, Figure 5 is a fragmentary longitudinal sectional view similar to Figure 4 but showing the air foils thrust outwardly and held in the air stream to form air brakes, Figure 6 is a plan view of a portion of the wing with the cover removed to expose my improved air brake in retracted position, Figure 7 is an enlarged longitudinal sectional view through the operating lever and adjacent parts, Figure 8 is an enlarged longitudinal sectional view through the extensible transverse member carried by the lever for connecting the push rods together, Figure 9 is a cross-sectional view taken on the line 9—9 of Figure 8, Figure 10 is a cross sectional view taken on the line 10—10 of Figure 8, Figure 11 is a detail perspective view showing the means for locking the lever in adjusted positions laterally with respect to the push rods, Figure 12 is a detail perspective view showing one of the push rods with its sleeve and a stop for holding the push rod in retracted position, Figure 13 is a detail perspective view showing one of the push rods and its spring pressed locking device, Figure 14 is a fragmentary cross sectional view taken on the line 14—14 of Figure 1 and showing one of the cables for holding the air foil in the air stream, and Figure 15 is a fragmentary perspective view showing a modified form of air foil.

Referring now to the drawings in which like characters of reference designate similar parts in the various views, a high-wing monoplane is illustrated comprising a fuselage 10, wings 11, ailerons 12 on the wings, tail controls 13, a motor 14 and a propeller 15, these parts being of the usual and well known construction.

The invention resides more specifically in building into the wing structure novel air foils and in accommodating the fuselage to receive the controls for the air foils and the description will be confined hereinafter to these specific parts of the airship, it being understood that the invention may be applied to other types of airships than the one illustrated and may be even extended to stabilizing controls for dirigibles. The wing structure as shown in the present embodiment is provided both on the top surface and on the lower surface with the air brakes comprising the subject matter of this invention. Since all of the air brakes and their operating mechanism for both surfaces are duplicates of each other, the air brake on the upper surface of one wing will be described and reference numerals applied thereto and these reference numerals will be duplicated on the air brake on the bottom surface of the wing.

Referring now to Figures 4 and 5 the airplane wing structure 11 is shown to comprise ribs 16, front and rear spars 17 and 18 preferably of metal truss construction, and a cover 19 which may be treated fabric wood or metal. The ribs 16 are preferably depressed longitudinally as shown at 20 near the trailing portions thereof and the cover 19 is provided transversely with a slot 21 which communicates with the rear ends of the depressions in the ribs.

An air foil 22, as best shown in Figure 6, is slidably fitted in the depressions 20 of the ribs underneath the cover, preferably the air foil being composed of a plurality of rigid slats 23, the longitudinal edges of which are hingedly connected together as shown at 24 so that the air foil is flexible. However, the flexible air foil may be formed of a single sheet 25 of material, as best shown in Figure 15. In either case preferably light strong metal is employed in the construction of the air foil. The rear slat 26 in both the preferred and modified forms of the air foil is off-set longitudinally and forms a closure for the slot 21 in the cover 19 so that the air foil will not interfere with the stream line contour of the wing during flight.

If desired, the depressions may be omitted and the foil may be mounted on ribs of ordinary construction.

The flexible air foil may be positively pushed out into the air stream through the slot in the cover and for this purpose push rods 27 (see Figures 2 and 3) are connected to the inner edge portion of the air foil and are connected to crank arms 28 carried by rock shafts 29 which are journaled in bearings 30 (see Figure 4) that are secured to the front spar 17. The push rods are operated from the pilot's cockpit by mechanism which will be presently described in detail. Each push rod is preferably passed through the open truss structure of the rear spar. The push rods serve to push the flexible air foil bodily out of the slot 21 in the cover and into the air stream as best shown in Figure 5.

For securing the free edge portion of the air foil to the wing structure a plurality of cables 33 are secured to the rear edge portion of the air foil, these cables normally lying exteriorly of the wing structure upon the cover. The forward end of each cable passes through an opening 34 in the cover as best shown in Figures 14 and is preferably connected to the rear spar, although the cable may be connected to the front spar if desired. Each cable is terminally equipped with a spring 36 which bears against the front face of the spar and forms a shock absorber for the air foil.

The cables 33 being substantially inextensible except for a slight lengthening under the compression of the springs 36, cause the flexible air foil to curve forwardly into the air stream when in operative position, and act somewhat as a miniature "chute" to retard speed of the ship in landing or during maneuvers as will be hereinafter more fully described. In addition to being shock absorbers the springs by compressing serve to place the center of pressure close to the cables when the air foils are open.

It will be noted by referring to Figure 1 that the air foils are disposed between the ailerons 12 and the fuselage in the trailing edge portions of the wing and are controlled independently of the ailerons and are further operated selectively, that is the air brakes 22 may all be applied simultaneously as a unit or individually to suit varying requirements during maneuvers or in landing.

For reinforcing and strengthening the wing structure to resist strain when the air foils are open, a plurality of ribs 37 are arranged outside of the cover and extend longitudinally of the interior ribs 16 and are stream line as shown. These exterior ribs 37 are rigidly secured preferably by bolts 37' to the front and rear spars and extend at their trailing edges substantially to the slot 21 in the cover so that when the air brake 22 is in operative position the air brake curves forwardly over the trailing ends of the exterior ribs. The cover 37'' extending from the front spar to the slot 21 may be attached rigidly to the outer ribs 37 so as to lift off when these ribs are removed to expose the air foil 22 and all working parts for inspection.

The mechanism for operating the push rods 27 to manipulate the air brakes will now be described. Preferably arranged in the cockpit within convenient reach of the pilot there is a hollow lever 38, best shown in Figures 3, 7 and 10.

The lower end of the lever terminates in a ball 39 which fits in a socket 40 and forms a pivot for the lever. The ball is normally at rest in the lower level of the socket and the lever may be raised vertically to dispose the ball in a seat 41 which also pivotally receives the ball. The weight of the lever is supported by a spring 41′ disposed in the socket 40.

The lever is provided with a transverse cylindrical casing designated in general by the numeral 42 and best shown in Figure 8. Referring now to Figures 3 and 10 it will be seen that the casing 42 is received in sleeves 43 formed on the rear ends of rods 44, the front ends of which rods are connected by suitable link mechanisms 45 to the above described crank shafts 29 which operate the push rods 27. This construction is clearly shown in Figures 2 and 3.

It is now clear that when the lever is rocked forwardly the rods 44 will be moved forwardly and through the instrumentality of the link mechanisms 45 and rock shafts 29 will push the push rods 27 to thrust the air brakes 22 bodily into the air stream exteriorly of the wing. Conversely, when the lever is rocked rearwardly the movement of the parts as just described is reversed and the air brakes are retracted or withdrawn and held concealed in the wing structure so as to be out of the air stream and not interfere with the stream line contour of the wings during flight.

In the present embodiment of the invention the transverse casing 42 is sufficient in length to connect together a pair of the sleeves 43 whereby a pair of the air brakes may be operated simultaneously. The casing, however, is made extensible as best shown in Figure 8, so that all of the sleeves may be engaged by the casing to operate all of the air brakes simultaneously when desired. To accomplish this the outer shell of the casing which is integral with the hollow lever as shown at 46, in Figure 7, slidably receives within its ends tubular casings 47 which are provided with integral washers 48 that fit in the threads of a worm 49. The worm has fixed thereto a pinion 50 which is held between stop discs 51 formed integral with the central portion of the outer shell and serves to rotate the worm. The washers 48 are provided with lugs 52 as best shown in Figure 9 which extend into the threads of the worm so that when the worm is operated both tubular casings 47 are simultaneously extended outwardly or retracted inwardly according to the direction of rotation of the worm.

The tubular casings 47 are held against rotation by means of pins 53 in the shell of the transverse casing fitting in slots 54 in the tubular casings. The end portions of the tubular casings 47 are enlarged to provide stop shoulders 55 which limit inward movement of the tubular casings within the shell.

It will thus be seen that when the transverse casing 42 is extended as above described it will be sufficient in length to connect together all of the sleeves 43. For extending and retracting the extensible transverse casing 42 there is a rack 56 mounted to slide vertically within the hollow lever, as best shown in Figure 7 and engages a pinion 57 carried by the lever and which meshes with the pinion 50 which operates the worm 49.

The upper end of the rack projects through the top of the lever and constitutes a grip 58 by means of which the rack may be moved downwardly to operate the worm. A helical spring 59 surrounds the rack and is confined between fixed discs 60 carried by the lever and through which the rack slides. This spring normally holds the rack in released position.

As best shown in Figure 2, the parts above described are disposed in centralized position to connect both air brakes on the top surfaces of the wings for simultaneous operation. Should it be desired to connect together the top and bottom air brakes of one wing alone for simultaneous operation the lever 38 must be shifted laterally to position the transverse casing 42 to connect one of the outer sleeves and one of the inner sleeves. Conversely, the top and bottom air brakes of the opposite wing may be connected by shifting the lever laterally in the opposite direction from that just described.

For holding the lever in any desired adjusted position laterally with respect to the sleeves 43 an arcuate guide frame 62, best shown in Figures 11 and 10, is provided at the ends with trunnions 63 which are receivable in arcuate slots 64 formed in correspondingly shaped guides 65 that are secured stationary at the ends of the guide frame. One side of the guide frame 62 is provided with a longitudinal angular recess 66 which receives an angular block 67 on the lever, (see Figure 7) and the opposite side of the guide frame is provided with a plurality of substantially semi-circular sockets 68 which selectively receive a semi-circular projection 69 on the lever as shown in Figure 7.

The sides of the guide frame 62 are sufficiently resilient to permit of the projection being dislodged from one socket and engaged in another socket when the lever is shifted laterally, to connect in desired combination any of the sleeves 43.

The rods 44 are normally locked against movement and to accomplish this, each rod 44 is provided with a lug 70, (see Figure 12) near its sleeve which lug engages the front edge of a stop plate 71 positioned below the rod as best shown in Figure 3. To free the rods 44 the lever 38 must be lifted vertically to position the ball 39 in the seat 41 and when this is done the lug 70 is dislodged from the stop plate 71 as shown in dotted lines in Figure 3 so that the lever may now be rocked forwardly to operate the rods.

It will be observed by referring to Figure 3 that the arcuate slots 64 in the arcuate guides 65 are formed with lower seats 72 which normally receive the trunnions 63 of the guide frame 62 when the lever is in inactive position. When the lever is lifted to move the push rods and push out the air foils 22 the trunnions 63 on the guide frame 62 pass out of the seats 72 and into the arcuate slot 64.

Referring now to Figures 2 and 13 it will be seen that each rod 44 is receivable within a support 73 which is open at one side, all of these supports being mounted on a suitable frame 74. An angular member 75 is pivotally mounted as shown at 76 on the frame, one leg of the member entering the open side of the support 73 and bearing against the corresponding rod 44. The member 75 is frictionally held against the rod as will presently be described to hold the rod against being dislodged from inoperative position due to vibration or other shocks or jars.

As best shown in Figure 2 the angular members 75 are all connected to a cable 77 one end of which is secured by means of a spring 78 to the frame 74 and the opposite end of which is trained over sheaves 79 and 80 carried by the frame. The cable 77 is conducted through an opening in the ball 39 and enters the hollow lever 38 as best shown in Figure 7. The cable is attached to a spring controlled pivoted latch 81. The latch 81 is operated by the pilot to move the cable 77 against the tension of the spring 78 and release the angular members 75.

The rack 56 is provided with a stop 82 which engages with a latch 83 carried by the lever when the rack is depressed to extend the extensible transverse casing 42 as above described. When the stop 82 is in engagement with the latch 83 the transverse casing is held extended.

It will be observed that the spring 78 (see Figure 2) is under sufficient tension to prevent slack occurring in the cable 77 at any position of the lever.

In operation, when it is desired to land in a small area all of the air brakes may be thrust out into the air stream simultaneously just at the moment the ship touches the ground. To accomplish this, first the member 58 is forced down and is held down by the latch 83. Thus, the transverse casing is extended and connects together all of the sleeves and the push rods, the inner rods bending to permit of this connection. Now the lever is raised to free all of the stop lugs 70 from the stop plates 71. Then the lever is rocked forwardly to push out the air brakes to whatever extent is needed. The cables 33 as above described lift up over the exterior of the wings and hold the air brakes curved forwardly in the air stream. This resistance to the air stream serves to retard the speed of the ship and prevent the long run which is so unsafe in making emergency landings.

It will be understood that the pilot may apply only the brakes on the top surfaces of the wings should he deem this sufficient to effect a safe landing.

While maneuvering the plane in flight should it be necessary to bring the plane out of a flat spin the air brakes on the high wing, either top or bottom surfaces, may be applied by shifting the lever laterally to connect for simultaneous operation, the air brakes on the high wing. The resistance thus offered by the high wing to the air stream will serve to level the wings.

A further object of the use of these air brakes is that a plane so equipped will stop sooner in landing than one equipped with wheel brakes because these air brakes can be used effectively long before wheel brakes will possibly take effect or can be used.

The air brakes also it will be observed constitute means for getting a plane out of a flat spin or auto-rotation by applying the brakes to the wing on the outside of rotation.

It will further be observed that a shorter turn in flight may be made by use of these air brakes to avoid an obstruction or another plane.

Furthermore, in case of drift the brakes on the wing towards the wind can be applied slightly so that the slight resistance of one wing over the other will maintain the plane on its true course.

Furthermore, greater maneuverability is provided under combat conditions and also it will be apparent that the use of these air brakes will prevent a plane from nosing over on landing on rough ground as well as providing means for assisting a plane out of a tail spin by applying the brakes on the tops of both wings.

Having thus described the invention, I claim:

1. An air brake for airships comprising a wing, an air foil formed of slats disposed longitudinally of the wing and hinged together at their longitudinal edges and normally concealed within the wing, and means for moving said air foil to operative position in the air stream exteriorly of the wing.

2. An air brake for airships comprising a wing, a flexible air foil slidably mounted near the trailing edge portion of the wing, means for positively pushing said air foil out into the air stream, and means securing the air foil to the wing structure whereby the air foil curves forwardly when in operative position.

3. The combination with the fuselage, wings and ailerons of an airplane, of flexible air brakes comprising air foils slidably mounted on the wings between the ailerons and fuselage and means for positively curving the air foils forwardly selectively into the air stream.

4. In an airplane wing structure, ribs, spars, a cover therefor, an air foil slidably fitted on said ribs and underneath said cover, means for moving said air foil to operative position outside of said cover and means connecting the outer edge of the air foil to one of said spars for holding said air foil in operative position.

5. In an airplane wing, an air brake comprising a plurality of rigid slats hinged together at their longitudinal edges and forming a flexible air foil, the wing structure normally concealing said air foil, there being a slot in the wing structure spaced from the trailing edge of the wing, the outermost slat of the air foil normally closing said slot, and means for moving said air foil to operative position through said slot.

6. In an airplane wing, an air brake comprising a flexible air foil housed within the wing structure, rods attached to the air foil for thrusting the air foil outwardly to project exteriorly of the wing, and cables attached to the wing and to the air foil and operating simultaneously with the rods to hold the air foil curved forwardly towards the leading edge of the wing.

7. In combination, a wing, spaced stream line ribs disposed exteriorly of the wing for stiffening the wing, a flexible air foil normally housed within the wing structure and adapted to be thrust out into the air stream over the trailing ends of said stream line ribs, and means for manipulating said air foil.

8. In an airplane wing, ribs having depressions near the rear ends, a cover having a transverse slot communicating with the rear ends of said depressions in said ribs, a flexible air foil slidably mounted in said depressions in said ribs and adapted to pass outwardly through the slot in said cover and project into the air stream, and means for manipulating said air foil.

9. In an airplane wing, ribs, a spar, a cover, an air foil slidably fitted on said ribs and adapted to be pushed outwardly through said cover into the air stream, means for pushing said air foil outwardly, a flexible cable disposed exteriorly of the wing and having one end connected to the free edge of the air foil for holding the air foil in the air stream, the outer end of said cable extending through openings in said cover and in said spar, and a spring on the last named end of said cable bearing against said spar and forming a shock absorber for said air foil.

10. In an airplane, air foils formed of jointed slats extending longitudinally of the wing structure and normally housed within the wing structure and adapted to be slid outwardly into the air stream to form air brakes, a pivoted lever, push rods operated by the lever for sliding said air foils into and out of the air stream, cables connecting the free edges of the foils to the wing structure to curve said foils forwardly when thrust into the air stream, and means operatively connecting the rods to the lever whereby the air foils may be selectively operated.

11. In an airplane, air foils carried by the wings and adapted to be slid outwardly into the air stream to form air brakes, sliding rods for moving the air foils to operative position, a pivoted lever adapted to slide said rods, said lever being shiftable laterally with respect to said rods, and a member carried by said lever adapted to connect together selected rods in pairs whereby the air foils may be selectively operated in pairs.

12. In an airplane, air foils carried by the wings and adapted to be slid outwardly into the air stream to form air brakes above and below the wings, sliding rods for manipulating respective air foils, a pivoted lever for sliding the rods, an extensible member carried by the lever for selectively connecting together a plurality of said rods, and means for extending said member to connect together all of said rods to operate all of said air foils as a unit.

13. In an airplane, air foils carried by the wings and adapted to be slid outwardly into the air stream to form air brakes, rods for manipulating the air foils, each rod terminating in a sleeve, a lever, and a transverse member carried by the lever and adapted to be selectively engaged in said sleeves to operate said rods.

14. In an airplane, air foils carried by the wings and adapted to be slid outwardly into the air stream to form air brakes, rods for operating the air foils terminating in sleeves, stops engaging said rods and holding said air foils retracted, a pivoted lever adapted to be shifted laterally and adapted to be raised vertically, and a transverse member on said lever adapted to be engaged in said sleeves when the lever is moved laterally and adapted to release said rods from said stops when said lever is raised vertically after being engaged in said sleeves.

15. In an airplane, air foils carried by the wings and adapted to be slid outwardly into the air stream to form air brakes, rods for sliding said air foils terminating in sleeves, a lever, a transverse member for selectively connecting said sleeves and having extensible end portions for connecting additional sleeves to said selected sleeves, a pinion and worm device carried by said transverse member for extending said end portions thereof, and a rack and pinion device carried by said lever for operating said pinion and worm device.

16. In an airplane, air foils carried by the wings and adapted to be slid outwardly into the air stream to form air brakes, rods for sliding said air foils, a pivoted lever having a transverse portion adapted to connect said rods, said lever being movable laterally to selectively connect said rods, and means for holding said lever in various adjusted positions.

17. In an airplane, air foils carried by the wings and adapted to be slid outwardly into the air stream to form air brakes, rods for sliding said air foils, supports for the rods, spring pressed members frictionally holding said rods in retracted position against said supports, a lever, a cable carried by the lever connecting said spring pressed members together, and means on said lever for operating said cable to release said spring pressed members.

18. In an airplane, flexible air foils carried by the wings and adapted to be slid outwardly into the air stream to form air brakes, cables connected to the free edges of the air foils and to the wing structure for curving the foils forwardly when thrust into the air stream, rock shafts carried by the wing having crank arms, rods connected to said crank arms and to air foils for sliding said air foils outwardly and inwardly when said rock shafts are actuated, and an operating lever connected to said rock shafts.

In testimony whereof I affix my signature.

RICHARD MICEK. [L. S.]